United States Patent
VanBlon et al.

(10) Patent No.: US 9,471,773 B2
(45) Date of Patent: Oct. 18, 2016

(54) APPARATUS, SYSTEM, AND METHOD FOR CONTEXT-SENSITIVE ROLLING PASSWORD GENERATION

(71) Applicant: LENOVO (Singapore) PTE, LTD., New Tech Park (SG)

(72) Inventors: Russell Speight VanBlon, Raleigh, NC (US); Jeffrey Mark Estroff, Cary, NC (US); Russell Stuart Gantman, Fuquay Varina, NC (US); Jason Grimme, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 87 days.

(21) Appl. No.: 13/949,078

(22) Filed: Jul. 23, 2013

(65) Prior Publication Data
US 2015/0033303 A1    Jan. 29, 2015

(51) Int. Cl.
*H04L 29/00* (2006.01)
*G06F 21/46* (2013.01)

(52) U.S. Cl.
CPC .................................. *G06F 21/46* (2013.01)

(58) Field of Classification Search
None
See application file for complete search history.

(56) References Cited

U.S. PATENT DOCUMENTS

| 4,720,860 | A | * | 1/1988 | Weiss | 713/184 |
| 2003/0037262 | A1 | * | 2/2003 | Hillhouse | 713/202 |
| 2006/0143450 | A1 | * | 6/2006 | Airody Udupa et al. | 713/168 |
| 2010/0082966 | A1 | * | 4/2010 | Lu | G06F 21/575 713/2 |
| 2012/0144203 | A1 | * | 6/2012 | Albisu | G06F 21/35 713/184 |
| 2013/0333007 | A1 | * | 12/2013 | Chougle et al. | 726/7 |

* cited by examiner

*Primary Examiner* — Brandon Hoffman
*Assistant Examiner* — Helai Salehi
(74) *Attorney, Agent, or Firm* — Kunzler Law Group

(57) ABSTRACT

An apparatus, system, and method are disclosed for context-sensitive password generation. The inspection module may accept entry of at least a new portion of a password by a user into a security mechanism and determine a dynamic parameter candidate within the password. The analysis module may recommend to the user a context-sensitive interpretation of the dynamic parameter candidate. The confirmation module may receive a selection by the user of the context-sensitive interpretation.

20 Claims, 8 Drawing Sheets

APPARATUS, SYSTEM, AND METHOD FOR CONTEXT-SENSITIVE ROLLING PASSWORD GENERATION

FIELD

The subject matter disclosed herein relates to password protection and more particularly relates to rolling passwords.

BACKGROUND

Description of the Related Art

It is generally considered good practice to change computer passwords regularly in order to improve system security. However, many users may neglect to do so for a variety of reasons. One reason may be difficulty in remembering a new password. Another reason may be difficulty in repeatedly creating strong passwords that meet the high standards and best practices for system security.

Those users who do regularly change passwords may resort to simply rolling through a small set of previously used passwords. Even if they avoid reusing previous passwords, they may choose passwords that are easily remembered but by the same token tend to be too weak. On the other hand, if they do make the effort to create a stronger password, the may resort to writing it down in case it is forgotten. As a result of all of these pitfalls, security can actually be harmed rather than improved by regular password changes.

Due to the foregoing difficulties, many users rarely change passwords. Even though better password management practices may exist in theory, their use as a practical matter tends to be very limited.

BRIEF SUMMARY

Based on the foregoing discussion, the inventors have recognized that a long-felt unmet need exists for an apparatus, system, and method for rolling password generation. Such an apparatus, system, and method would remind, prompt and otherwise assist a user in generating rolling passwords. Beneficially, such an automated mechanism would be context-sensitive, to facilitate remembering the password without sacrificing strength and security.

Embodiments have been developed in response to the present state of the art, and in particular, in response to the problems and needs in the art hitherto proven intractable under currently available context-sensitive password generation. Accordingly, the embodiments have been developed to provide a method, apparatus, and system for context-sensitive password generation that overcome many or all of the above-discussed shortcomings in the art.

The apparatus to generate a context-sensitive password is provided with a plurality of modules configured to functionally execute steps. These modules in the described embodiments include an inspection module an inspection module that may accept entry of at least a new portion of a password by a user into a security mechanism and determine a candidate for a dynamic parameter within the password, an analysis module that may recommend to the user a context-sensitive interpretation of the dynamic parameter, and a confirmation module that may receive a selection by the user of the context-sensitive interpretation.

In various embodiments, the dynamic parameter may comprise one or more of a number, a word, a phrase, and an alphanumeric expression, and so forth. The context may comprise one or more of a time, a day, a date, a location, a type of computer, an environmental characteristic, or the like.

In one embodiment, the analysis module may map the dynamic parameter to the context to yield the context-sensitive interpretation. In a further embodiment, the confirmation module may confirm with the user the selection of the interpretation with an example of the password based upon a current context.

A system is also presented to generate a context-sensitive password. The system may be embodied by an information handling system having hardware and software resources, the security mechanism that may control access to the resources of the information handling system by means of a password; and the foregoing apparatus for context-sensitive password generation. In particular, the system, in an embodiment, includes a database module that may store the password.

In one embodiment, one or more static portions of the password may be stored in separate database entries. In another embodiment, the password may be stored in a single database entry with the dynamic parameter replaced by one or more special static characters.

In a further embodiment, the system may also comprise an authentication module that may compare the dynamic parameter in the password with the current context and provide a result of the comparison to the security mechanism.

A method is also presented for calibrating a pointing device. The method in the disclosed embodiments substantially includes steps to carry out the functions presented above with respect to the operation of the described apparatus and system. In one embodiment, the method may include accepting entry of at least a new portion of a password by a user into a security mechanism, determining a candidate for a dynamic parameter within the password, recommending to the user a context-sensitive interpretation of the dynamic parameter, and receiving a selection by the user of the context-sensitive interpretation.

In an embodiment, the method may include mapping the dynamic parameter to the context to yield the context-sensitive interpretation and confirming with the user the selection of the interpretation with an example of the password based upon a current context.

In one embodiment, the method may comprise presetting categories and mapping rules of the dynamic parameter. In a further embodiment, the categories and mapping rules may be customizable by the user.

In various embodiments, the method also may include allowing the user to change the context of the dynamic parameter, to change the interpretation of the dynamic parameter, to change a static portion of the password, and so forth. In a further embodiment, the method may include autocompleting the dynamic parameter during entry of the password by the user.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
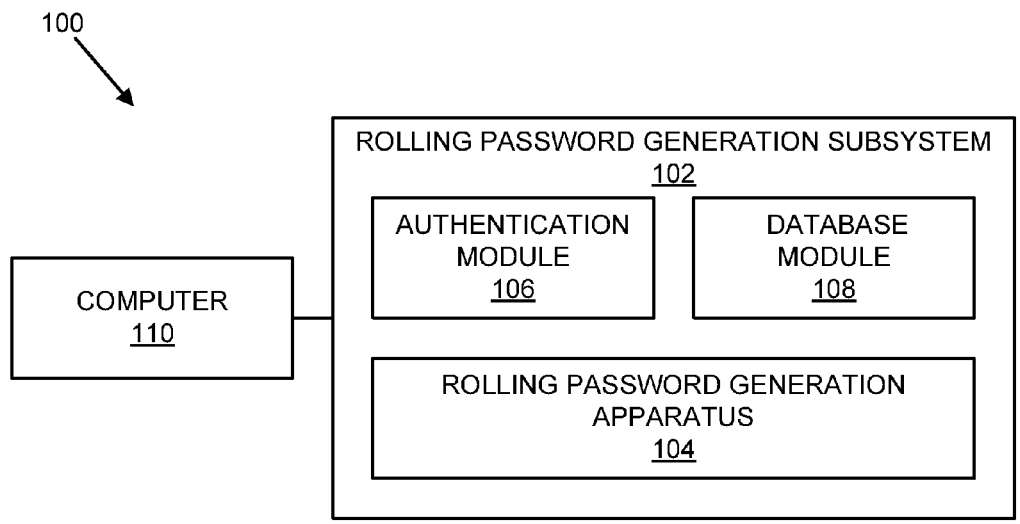
FIG. 1 is a schematic block diagram illustrating a system of a present embodiment.

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The proposed solution to the problems with rolling password generation is to remind, prompt and otherwise assist a user in generating context-sensitive rolling passwords for enhanced security. Various automated assists may be provided, such as dynamic parameter recognition, user training by example, prompting the user to change static portions or dynamic parameters of the password, autocompletion of partially entered new portions of the password, encoding dynamic parameters with expressions selected from various categories, and secure hashing and storage of the composite dynamic/static rolling password.

FIG. 1 is a schematic block diagram illustrating a system 100 of a present embodiment, including a computer or information handling system 110 and a rolling password generation subsystem 102. The subsystem 102 further includes a rolling password generation apparatus 104, an authentication module 106, and a database module 108. In an embodiment, the foregoing components of the subsystem 102 may be fully or partially implemented within a hardware platform and/or a software stack of the computer 110.

The apparatus 104 may accept entry of at least a new portion of a password by a user into a security mechanism, determine a candidate for a dynamic parameter within the password, recommend to the user a context-sensitive interpretation of the dynamic parameter, and receiving a selection by the user of the context-sensitive interpretation.

Figure 2:
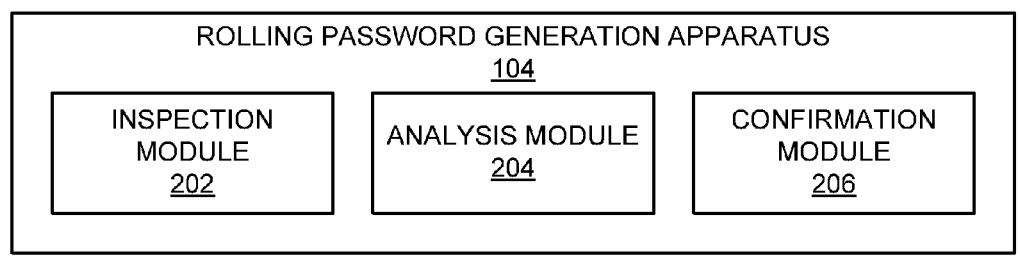
FIG. 2 is a schematic block diagram illustrating a rolling password generation apparatus.

The authentication module 106 may compare the dynamic parameter in the password with the current context and provide a result of the comparison to the security mechanism. The database module 108 may store the password. In one embodiment, one or more static portions of the password may be stored in separate database entries. In another embodiment, the password may be stored in a single database entry with the dynamic parameter replaced by one or more special static characters FIG. 2 is a schematic block diagram illustrating a rolling password generation apparatus 104, including an inspection module 202, an analysis module 204, and a confirmation module 206. The inspection module 202 may accept entry of at least a new portion of a password by a user into a security mechanism and determine a candidate for a dynamic parameter within the password. The analysis module 204 may recommend to the user a context-sensitive interpretation of the dynamic parameter. The confirmation module 206 may receive a selection by the user of the context-sensitive interpretation.

The inspection module 202 may further preset categories and mapping rules of the dynamic parameter, and the categories and mapping rules may also be customizable by the user. In various embodiments, the inspection module 202 also may allow the user to change the context of the dynamic parameter, to change the interpretation of the dynamic parameter, to change a static portion of the password, and so forth. In a further embodiment, the inspection module 202 may autocomplete the dynamic parameter during entry of the password by the user.

The analysis module 204 may further map the dynamic parameter to the context to yield the context-sensitive interpretation. The confirmation module 206 may further confirm with the user the selection of the interpretation with an example of the password based upon a current context.

Figure 3:
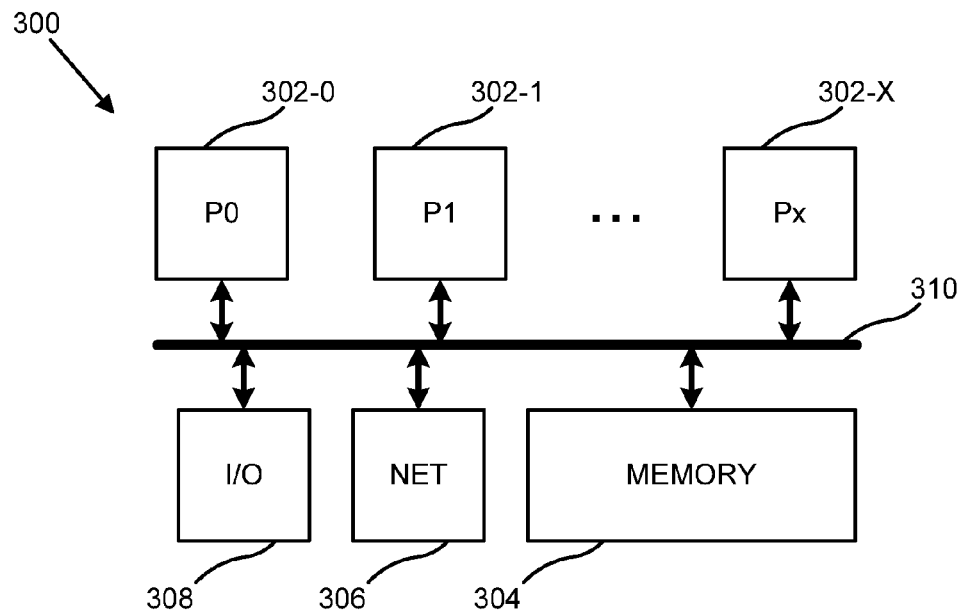
FIG. 3 is a schematic block diagram illustrating a possible computer hardware platform upon which present embodiments may be at least in part deployed.

FIG. 3 illustrates a possible computer hardware platform 300 upon which present embodiments may be at least in part deployed. The hardware platform 300 may include processor(s) 302, memory 304, a network interface 306, and an I/O (Input/Output) device interface 308, connected through a bus 310.

The hardware platform 300 may be of any form factor or type, including an embedded system, a handheld, a mobile phone, a pad, a notebook, a personal computer, a minicomputer, a server, a mainframe, a supercomputer, and the like.

The processor(s) 302 may be present in any quantity, including a uniprocessor, and may have any instruction set architecture. In an embodiment, the processor(s) 302 may have one or more levels of dedicated or shared caches. Possible physical implementations may include multi-chip, single chip, multi-core, hyperthreaded processors, and the like.

The memory 304 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 306 may support any network protocol or architecture. It may support both wireless and hard-wired network connections. It may comprise Ethernet, Token Ring, System Network Architecture ("SNA"), and the like. In one embodiment, it may be integrated with the I/O device interface 308.

The I/O device interface 308 may be driven primarily by the processor(s) 302 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 310 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 310 may comprise a high-speed internal network.

Figure 4:
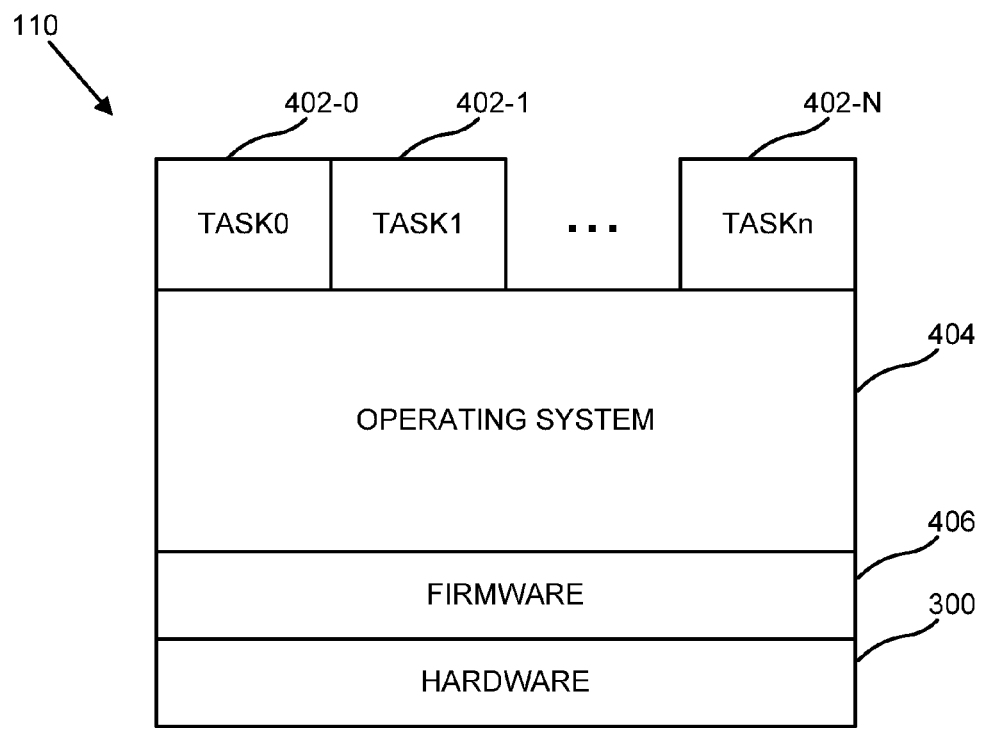
FIG. 4 is a schematic block diagram of a possible computer including a software stack in which present embodiments may at least in part reside.

FIG. 4 is a diagram of a possible computer 110 including a software stack in which present embodiments may at least in part reside. The software stack may include task(s) 402, hosted on an operating system 404, enabled by firmware 406, running on a hardware platform 300 of which the configuration of FIG. 3 is representative.

The task(s) 402 may include both user- and system-level tasks. They may be interactive or batch. They may run in the foreground or background. User-level task(s) 402 may include applications, programs, jobs, middleware, and the like. System-level task(s) 402 may include services, drivers, daemons, utilities, and the like.

The operating system 404 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 404 may be single-user or multi-user. It may be single-tasking or multi-tasking. In an embodiment, the operating system 404 may be real-time. In another embodiment, the operating system 404 may be embedded.

The firmware 406 may comprise microcode, which may reside in a microstore of the processor(s) 302. In an embodiment, the firmware 406 may comprise low-level software, which may reside in memory 304. In one embodiment, the firmware 406 may comprise a rudimentary operating system 404. In a further embodiment, the firmware 406 may support virtualization so as to permit the concurrent operation of multiple operating systems 404 on a hardware platform 300.

Figure 5:
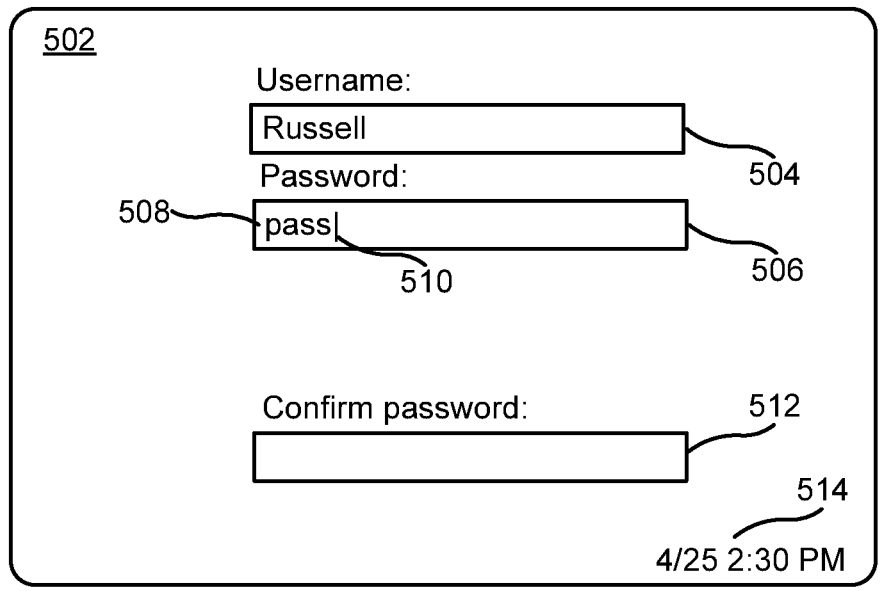
FIG. 5 is a schematic block diagram illustrating an embodiment of rolling password inspection.

FIG. 5 is a schematic block diagram illustrating an embodiment of rolling password inspection. A display 502 is provided, which may comprise a monitor, a touchscreen, a window, a dialog box, or the like. A username (e.g. 'Russell') may be entered into a username textbox 504 on the display 502. A password textbox 506 on the display 502 may accept entry of at least a new portion of a password 508 by the user (e.g. 'pass') as indicated by the current position of the text cursor 510. The inspection module 202 may inspect the password 508 as it is entered into the textbox 506 at the text cursor 510. A password confirmation text box 512 and date/time 514 are also shown on the display 502.

Figure 6:
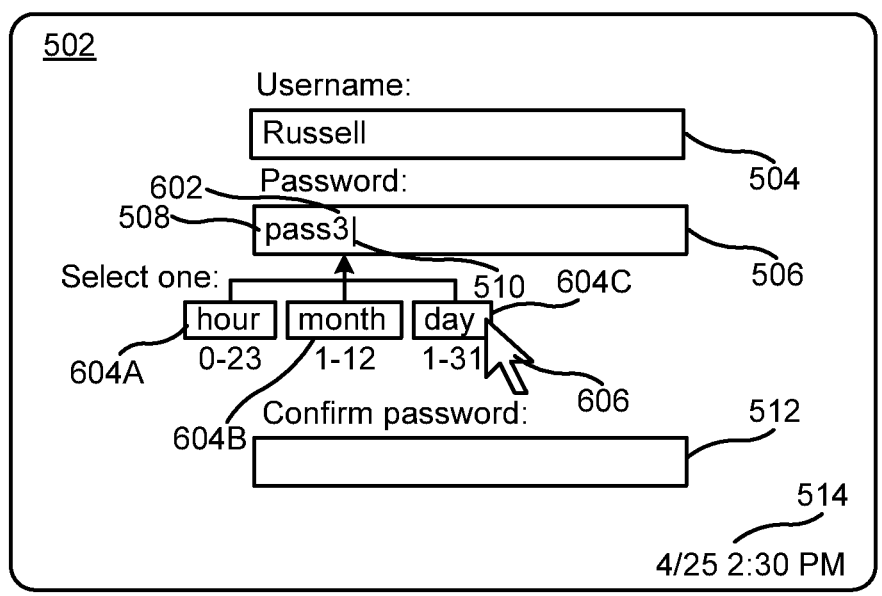
FIG. 6 is a schematic block diagram illustrating an embodiment of rolling password analysis.

FIG. 6 is a schematic block diagram illustrating an embodiment of rolling password analysis. The inspection module 202 may determine a dynamic parameter candidate 602 (e.g. a numeric character) within the password 508 at the text cursor 510. The dynamic parameter candidate 602 in the example shown is the number three ('3'). The analysis module 204 may recommend to the user a context-sensitive interpretation 604 of the dynamic parameter candidate 602, from a list of choices such as the hour 604A, the month 604B, the day 604C, and so forth, and the confirmation module may receive a selection 606 by the user of the context-sensitive interpretation 604C. In the example shown the user has made a selection 606 with an arrow cursor, selecting the day 604C as the context-sensitive interpretation 604.

The dynamic parameter candidate 602 may not necessarily be restricted to a number, but may be any category of automatic password phrase. Multiple phrases may be detected and used to display potential rolling passwords to the user. If the user inputs a known term within a given category (e.g. animal, color, action, and so forth), the user could be prompted to use a rolling password and given the choice of which automatic phrases to use, as well as the context-sensitive interpretation 604. For example, a certain animal could be designated for each day of the week, such as 'passDogword' where 'Dog' might correspond to Tuesday. The user could customize the words used or be presented with preset categories.

Conversely, a number may also be used in the new password 508 that is not part of the dynamic parameter candidate 602, such as 'pass83word' where only '3' and not '8' is the dynamic parameter candidate 602. In this case, the user might type 'pass8', and then ignore/dismiss any suggested interpretations 604 for the '8' that are offered by the system. As the user continues to type 'pass83', the user would then select one of the offered interpretations 604. In general, a rolling password may be used when candidates 602 for a dynamic parameter are detected, but it is not required—the user can choose to ignore any suggested interpretations 604.

More generally, even if the user merely enters any composite phrase such as 'password' the system could detect 'pass' and/or 'word' as a dynamic parameter candidate 602, and suggest automatic phrases to substitute for it. For example, Monday's password could be 'throwword', Tuesday's password could be 'kickword', and so forth. In this example, the suggested dynamic parameter candidate 602 is selected from the category of bodily actions. Alternatively, Monday's password could be 'passsentence', Tuesday's password could be 'passparagraph', and so forth. In this example, the suggested dynamic parameter candidate 602 is selected from the category of grammatical terms.

In one embodiment, the context-sensitive interpretation 604 could be spatial (i.e. a location) as opposed to temporal (i.e. time or date). If the user types part or all of a known location, a list of interpretations 604 such as city, state, country, province, and so forth could be presented to the user. Indeed, the context is not limited to time and place, but may comprise any detectable aspect of the system or physical environment, such type of computer hardware, software configuration, physical orientation, and so forth.

In another embodiment, rather than having the system automatically detect a potential dynamic parameter candidate 602 on the fly as the user types in the new password 508, the user could manually select it on another screen or display element of the user interface, after creating the new password 508. Alternatively, the user could manually type in brackets or other special symbols to identify the dynamic parameter candidate 602 while entering the new password 508. The system could also suggest candidates 602 for a dynamic parameter and related information such as category, context-sensitive interpretation 604, and mapping rules, for the user to pick from prior to entering the new password 508, which might also obviate the need for the system to offer the context-sensitive interpretation 604 during entry of the new password 508.

Figure 7:
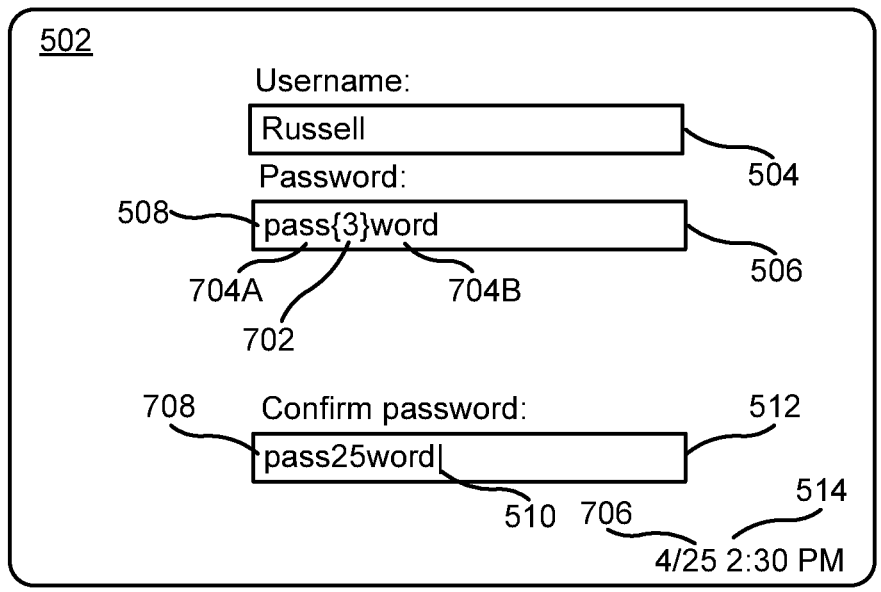
FIG. 7 is a schematic block diagram illustrating an embodiment of rolling password confirmation.

FIG. 7 is a schematic block diagram illustrating an embodiment of rolling password confirmation. The system may place brackets as shown or some other delimiter or indicator on or around the dynamic parameter 702 to set it apart from the static portion(s) 704 of the new password 508. The analysis module 204 may map the dynamic parameter 702 to the current context 706 (day of the month) to apply the context-sensitive interpretation 604 as received by the confirmation module 206. The confirmation module 206 may confirm with the user the selection of the context-sensitive interpretation 604 with an example 708 of the password based upon the current context 706.

The password confirmation textbox 512 may be provided for the user to confirm the password to ensure that the user understands the rolling password. In one embodiment, additional example 708 passwords may be displayed to the user to test their understanding of the new password(s) 508 used. In a further embodiment, after creating the new password 508, a help screen or confirmation email may be sent to the user containing the list of corresponding numbers, phrases, characters, strings, or the like that are used within the new password 508.

Figure 8:
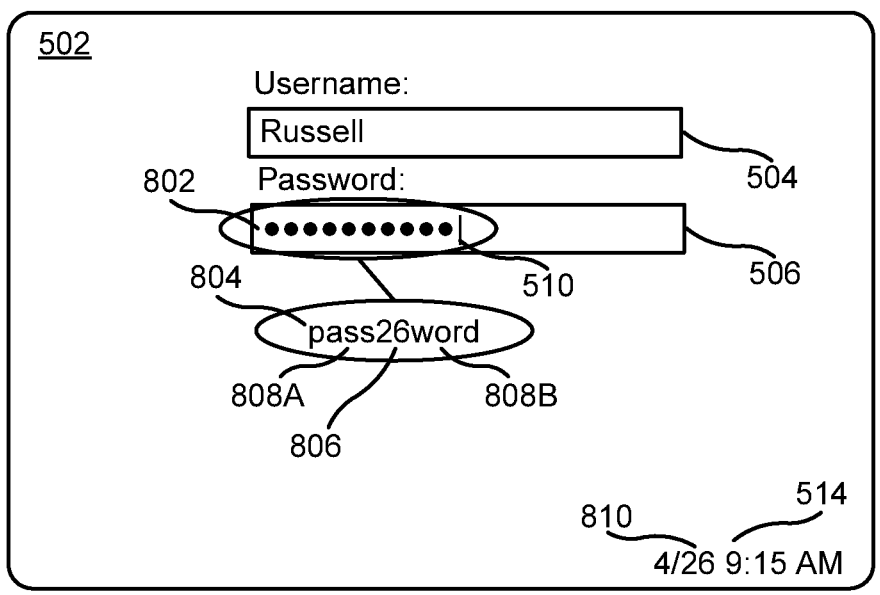
FIG. 8 is a schematic block diagram illustrating an embodiment of rolling password authentication.

FIG. 8 is a schematic block diagram illustrating an embodiment of rolling password authentication. A password 802 may be entered in the password textbox 506 as indicated by the current position of the text cursor 510. The characters in the password 802 may be displayed as black dots as shown, for greater security. For purposes of illustration only, the plain text 804 of the password 802 is shown. The plain text 804 would not normally actually appear on the display 502, unless a plain text mode were provided and enabled by the user.

The authentication module 106 may compare the dynamic parameter 806 ('26') in the password 802 with the current context 810 (day of the month) and provides a result of the comparison to the security mechanism. As can be seen in the plain text 804, the dynamic parameter 806 ('26') matches the current context 810 (day of the month). The static portion 808A also matches the static portion 704A ('pass') and the static portion 808B matches the static portion 704B ('word'). Based on this successful match between the password 802 and the new password 508, the user may then be permitted to access the system or whatever specific system resources may be protected by the security mechanism.

Alternatively, if the current context were geographical, then when the user is challenged for the password 802, the current location would need to be correctly entered as the dynamic parameter 806. In general, whatever environmental characteristic may have been chosen for the dynamic parameter candidate 602 must be correctly specified as the dynamic parameter 806 within the current context 808.

Furthermore, if a category were specified for the dynamic parameter candidate 602, then the correct member of that category would need to be entered. For example, if the category were animals, then the specific animal (e.g. 'Dog') corresponding to the current context 808 would have to be specified as the dynamic parameter 806 in order for the password 802 to be accepted.

Figure 9:
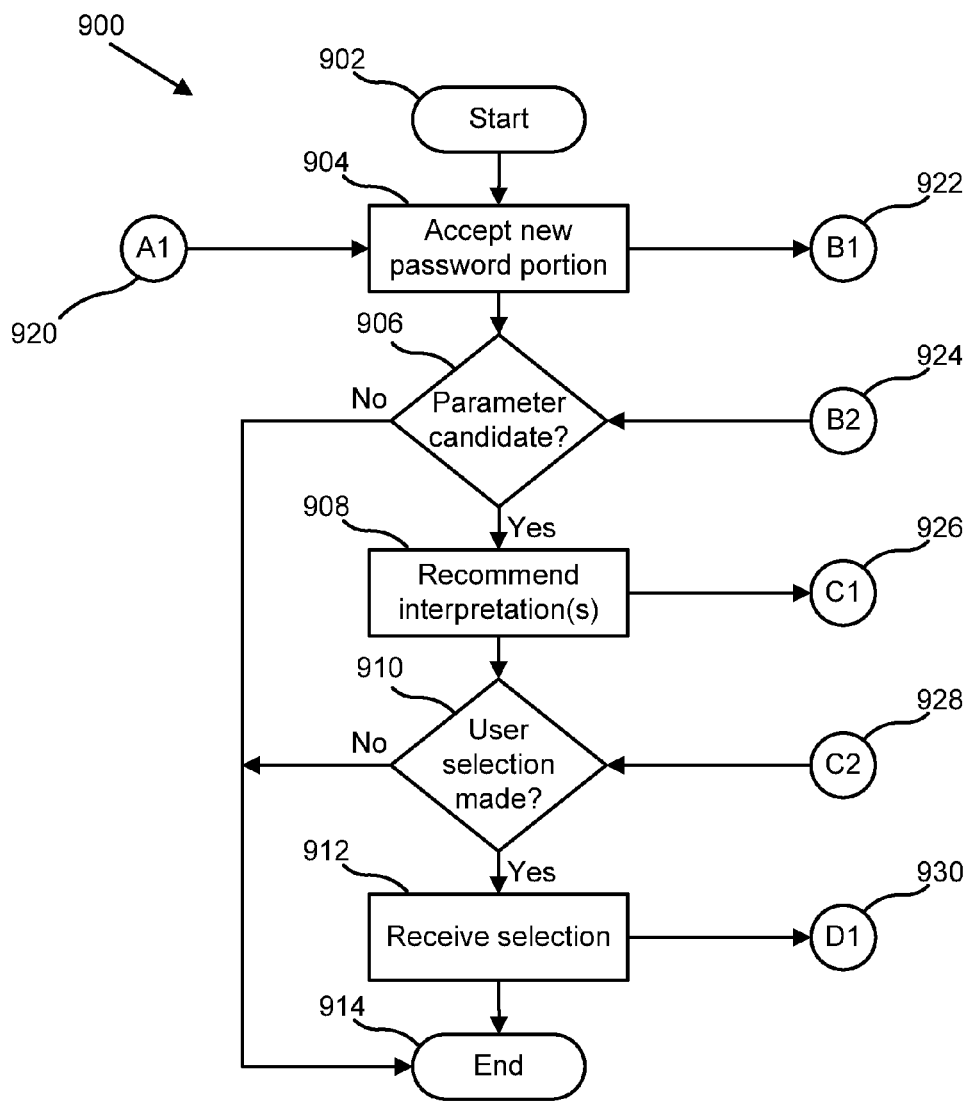
FIG. 9 is a schematic flow chart illustrating an embodiment of rolling password generation.

FIG. 9 is a schematic flow chart illustrating an embodiment of rolling password generation. The method 900 starts 902 and the inspection module 202 accepts 904 entry of at least a new portion of a password 508 entered by a user into a security mechanism and determines 906 a dynamic parameter candidate 602 within the password 508. In one embodiment, the inspection module 202 may detect a potential dynamic parameter candidate 602 as it monitors the user typing in the new portion of the password 508. In another embodiment, the user may be prompted for a rolling password without having entered part of a known phrase, based on suggestions chosen and pre-programmed by a server system administrator or device creator.

If no determination 906 of a dynamic parameter candidate 602 is made then the method 900 ends 914. Otherwise, the analysis module 204 recommends 908 to the user a context-sensitive interpretation 604 of the dynamic parameter candidate 602 for the user to select 910. If no selection 910 is made then the method 900 ends 914. Otherwise, the confirmation module 206 receives 912 the selection by the user of the context-sensitive interpretation 604, and the method 900 ends.

Figure 10:
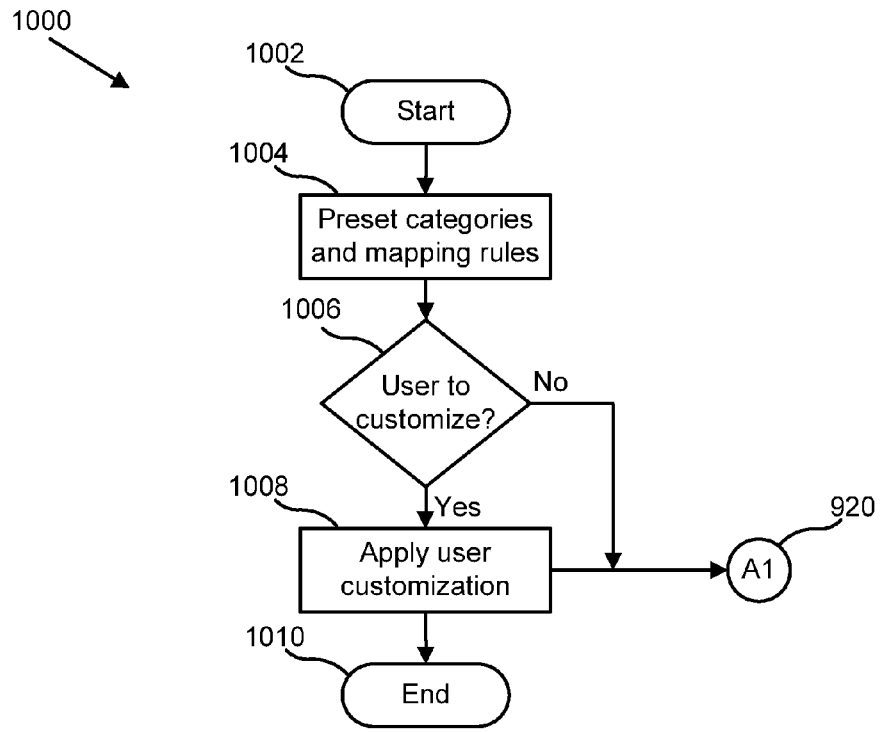
FIG. 10 is a schematic flow chart that illustrates an embodiment of presetting categories and mapping rules.

FIG. 10 is a schematic flow chart that illustrates an embodiment of presetting categories and mapping rules. The method 1000 starts 1002 and the system presets 1004 categories and mapping rules of the dynamic parameter candidate 602. For example, a category may be 'animals' for days of the week, and a mapping rule may be that 'Dog' corresponds to Tuesday. Allowed rolling passwords may be controlled via the server where the new password 508 is being created.

If the categories and mapping rules are customizable 1006 by the user then the user customization is applied 1008 to the categories and/or mapping rules. For example, the user might change the mapping rule for Tuesday from 'Dog' to 'Cat' or might change the preset category from 'animals' to 'colors'. In any case, the method 900 proceeds 920 via node A1 to accept 904 entry of the new password 508, as already described above, and the method 1000 ends 1010.

Figure 11:
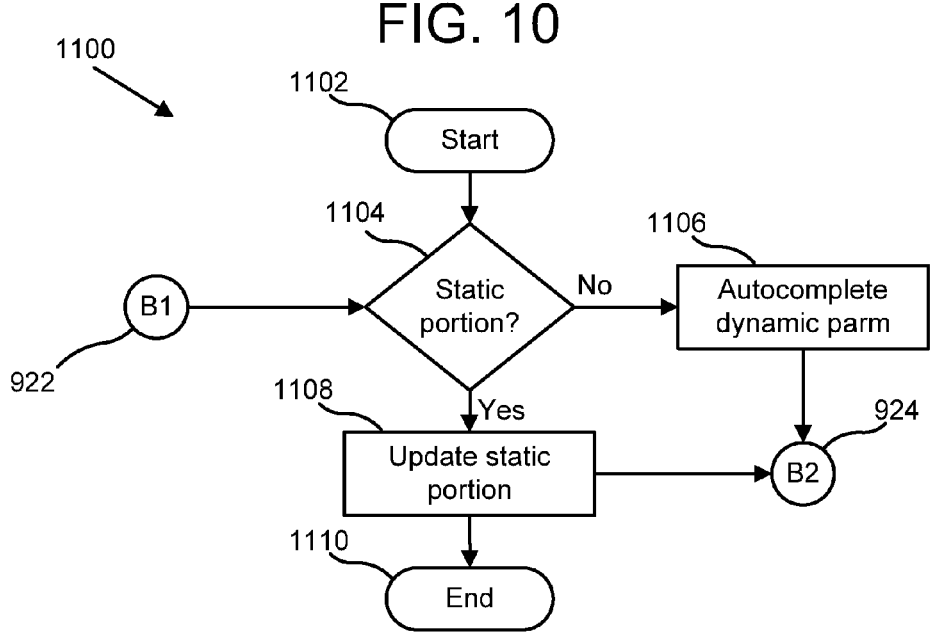
FIG. 11 is a schematic flow chart diagram illustrating changing a static portion and autocompleting a dynamic parameter of the rolling password.

FIG. 11 is a schematic flow chart diagram illustrating changing a static portion 704 and autocompleting a dynamic parameter 602 of the rolling password. The method 1100 starts 1102 after the method 900 accepts 904 a new password portion 508, as already described above, and proceeds 922 via node B1 to determine 1104 whether the new password portion 508 may be dynamic or static.

If dynamic, the system may offer to autocomplete 1106 the dynamic parameter candidate 602 for the user. For example, if the user enters '2' the system may offer the current day of the month '25' as a dynamic parameter candidate 602. If static, the system my offer the user the opportunity to update 1108 the static portion 704 of the password. For example, if the user enters 'pass' the system may note that it was used before and suggest that the user change that portion 704 of the password. In either case, the method 900 proceeds 924 via node B2 to complete the determination 906 of a dynamic parameter candidate 602, as already described above, and the method 1100 ends 1110.

Figure 12:
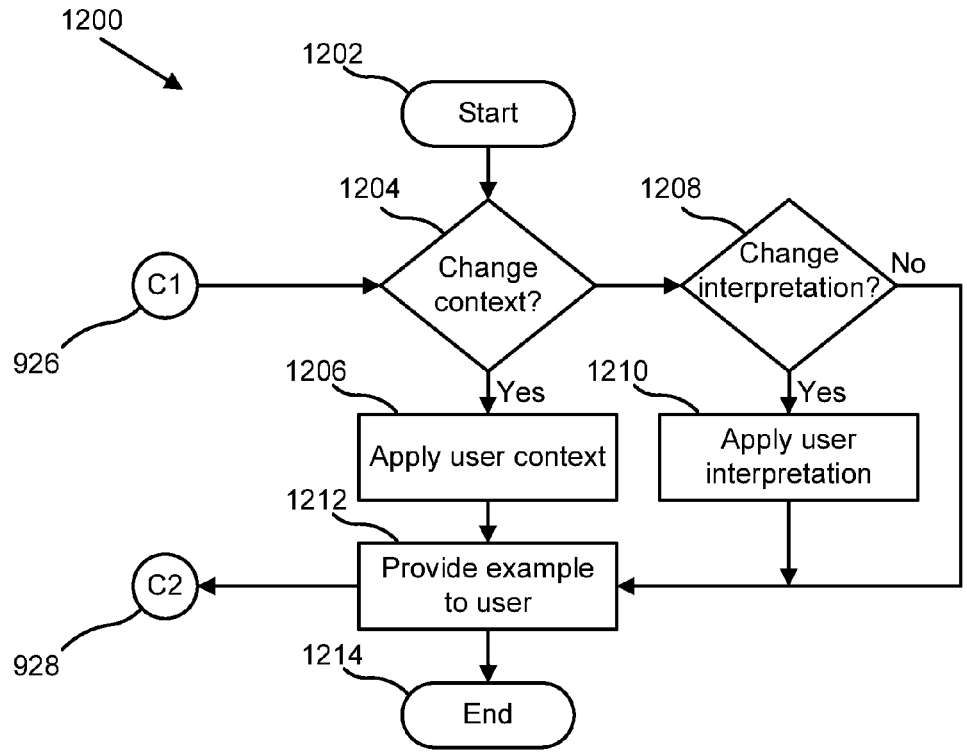
FIG. 12 is a schematic flow chart diagram illustrating changing a context or interpretation of the dynamic parameter and confirming it with an example.

FIG. 12 is a schematic flow chart diagram illustrating changing a context or interpretation of the dynamic parameter and confirming it with an example. The method 1200 starts 1202 after the method 900 recommends 908 to the user a context-sensitive interpretation 604 of the dynamic parameter candidate 602, as already described above, and proceeds 926 via node C1 to offer the user the opportunity to change 1204 the context and/or to change 1208 the context-sensitive interpretation 604.

If the user opts to change 1204 the context then the system may apply 1206 a context as specified by the user. For example, if the default system context is the date and time, the user might specify location as the context instead. If the user opts to change 1208 the interpretation 604 then the system may apply 1210 an interpretation 604 as specified by the user. For example, if the default system interpretation 604 includes the hour, month and day, the user might specify the Julian date instead.

In any case, once the context and the interpretation 604 have been established, the confirmation module 206 may confirm with the user the selection of the interpretation 604 by providing 1212 an example of the password 708 based upon the current context. The method 900 proceeds 928 via node C2 to permit the user to select 910 the context-sensitive interpretation 604 of the dynamic parameter candidate 602, as already described above, and the method 1200 ends 1214.

Figure 13:
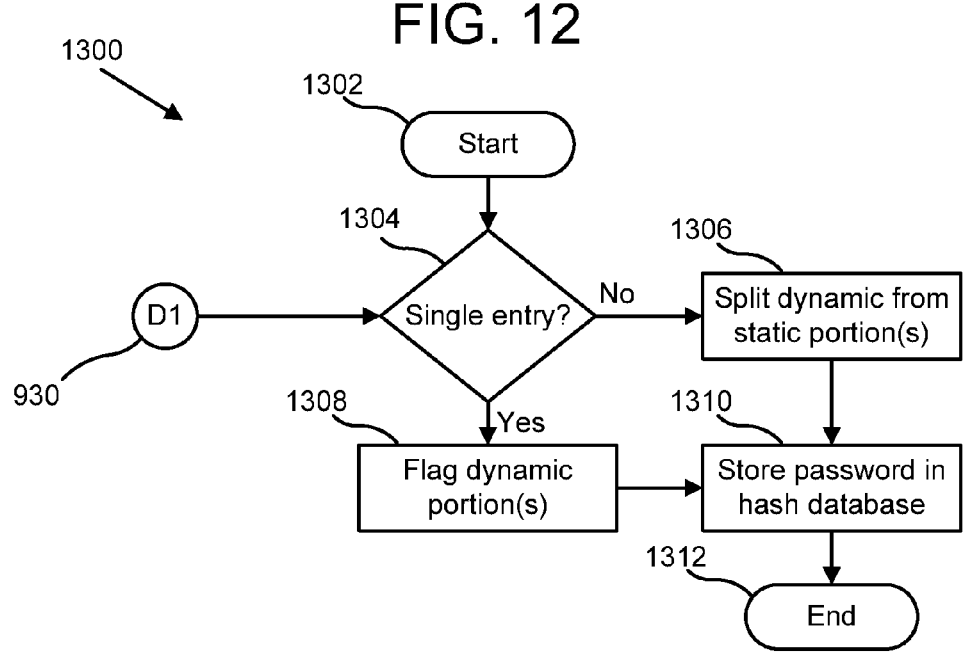
FIG. 13 is a schematic flow chart diagram illustrating storing the rolling password portions in one or more database entries.

FIG. 13 is a schematic flow chart diagram illustrating storing the rolling password portions in one or more database entries. The method 1300 starts 1302 after the method 900 receives 912 the selection by the user of the context-sensitive interpretation 604, as already described above, and proceeds 930 via node D1 to determine whether or not to use a single 1304 database entry for the new password 508.

If a single 1304 entry is not to be used, the static portions 704 are split 1306 into separate database entries. In this case, multiple hashes may be used for the static portions 704 of the password 508. For example, 'pass11word' would have two separate hashes for 'pass' and 'word', apart from the dynamic parameter(s) 702 and other related information such as category, context-sensitive interpretation 604, and mapping rules. The database module 108 may then store 1310 the one or more static portions 704 in separate database entries and the method 1300 ends 1312.

If a single 1304 entry is to be used, the dynamic parameter(s) 702 may be flagged in some fashion within the new password 508. In one embodiment, the password 508 may be hashed with the dynamic parameter 702 having been replaced by one or more special static characters not otherwise allowed in the static portions 704. In another embodiment, the password 508 may be kept as plain text with a placeholder for the dynamic parameter 702.

In one embodiment, the special static characters may delimit the dynamic parameter(s) 702 and other related information such as category, context-sensitive interpretation 604, and mapping rules. In another embodiment, the special static characters may encode the information related to the dynamic parameter(s) 702. For example, the related information may be encoded in unprintable binary characters. The database module 108 may then store 1310 the password 508 in a single database entry and the method 1300 ends 1312.

Figure 14:
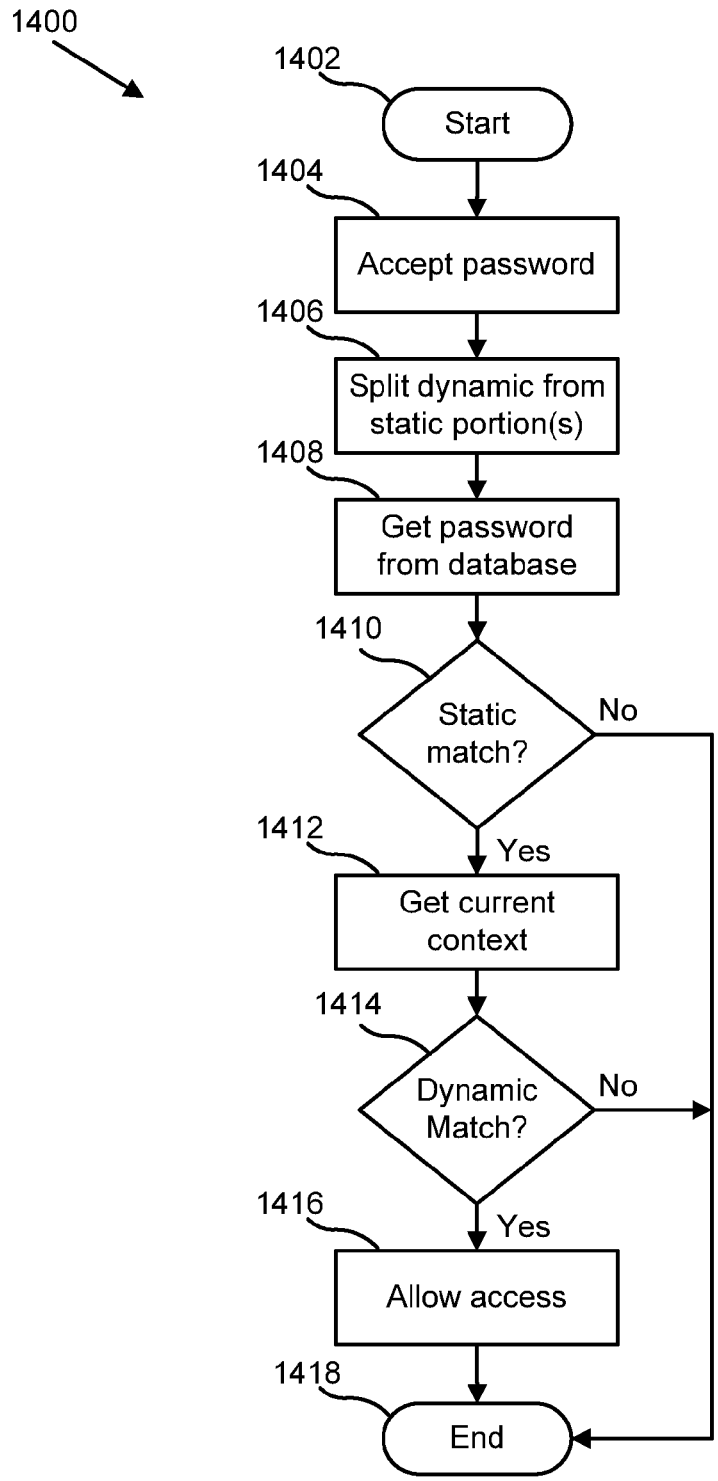
FIG. 14 is a schematic flow chart diagram illustrating authenticating the rolling password.

FIG. 14 is a schematic flow chart diagram illustrating authenticating the rolling password. The method 1400 starts 1402 and accepts 1404 a password 802. The static portion(s) 808 may be split 1406 from the dynamic parameter(s) 806. The correct password 508 is retrieved 1408 from the database. The authentication module 106 may compare 1410 the static portion(s) 808 with the correct static portions 704 and provide a result of the comparison 1410 to the security mechanism. If the comparison 1410 does not match, the method 1400 ends 1418.

If the comparison 1410 does match, the current context 810 is obtained 1412. The authentication module 106 may compare 1414 the dynamic parameter 806 with the current context 810 and provide a result of the comparison 1414 to the security mechanism. If the comparison 1414 does not match, method 1400 ends 1418. If the comparison 1414 does match, the user may be allowed 1416 access to the system or whatever specific system resources may be protected by the security mechanism, and the method 1400 ends 1418.

In a further embodiment, if the user forgets the password 802, a 'forgot password' link may send an email to the user with a list of terms used in the rolling password and/or the correlation to the current context 810.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an inspection module that accepts entry of at least a new portion of a password by a user into a security mechanism and automatically determines a non-predetermined candidate for a dynamic parameter within the password, wherein the dynamic parameter, though provided by the user, is not prompted from nor explicitly identified by the user;
   an analysis module that maps the dynamic parameter to a context comprising detectable aspects of a temporal, spatial and environmental nature and recommends to the user one or more context-sensitive interpretations of the dynamic parameter; and
   a confirmation module that receives a selection by the user of the context-sensitive interpretation wherein the inspection module, the analysis module, and the confirmation module comprise one or more of logic hardware and executable code, the executable code stored on one or more memory devices.

2. The apparatus of claim 1, wherein the analysis module maps the dynamic parameter to the context to yield more than one choice of context-sensitive interpretation.

3. The apparatus of claim 1, wherein the confirmation module confirms with the user the selection of the interpretation with an example of the password based upon a current context.

4. The apparatus of claim 1, wherein the dynamic parameter is selected from the set consisting of a number, a word, a phrase, and an alphanumeric expression.

5. The apparatus of claim 1, wherein the context is selected from the set consisting of a time, a day, a date, a location, a type of computer, and an environmental characteristic.

6. A system comprising:
   an information handling system having hardware and software resources;
   a security mechanism that controls access to the resources of the information handling system by means of a password;
   an inspection module that accepts entry of at least a new portion of a password by a user into the security mechanism and automatically determines a non-predetermined candidate for a dynamic parameter within the password, wherein the dynamic parameter, though provided by the user, is not prompted from nor explicitly identified by the user;
   an analysis module that maps the dynamic parameter to a context comprising detectable aspects of a temporal, spatial and environmental nature and recommends to the user one or more context-sensitive interpretations of the dynamic parameter; and
   a confirmation module that receives a selection by the user of the context-sensitive interpretation.

7. The system of claim 6, further comprising a database module that stores the password.

8. The system of claim 6, further comprising an authentication module that compares the dynamic parameter in the password with the current context and provides a result of the comparison to the security mechanism.

9. The system of claim 7, wherein one or more static portions of the password are stored in separate database entries.

10. The system of claim 7, wherein the password is stored in a single database entry with the dynamic parameter replaced by one or more special static characters.

11. A computer program product comprising a non-transitory computer readable storage medium storing a computer readable program code executed to perform operations for password generation, the operations of the computer program product comprising:
    accepting entry of at least a new portion of a password by a user into a security mechanism;
    automatically determining a non-predetermined candidate for a dynamic parameter within the password, wherein the dynamic parameter, though provided by the user, is not prompted from nor explicitly identified by the user;
    mapping the dynamic parameter to a context comprising detectable aspects of a temporal, spatial and environmental nature;
    recommending to the user one or more context-sensitive interpretations of the dynamic parameter; and
    receiving a selection by the user of the context-sensitive interpretation.

12. The computer program product of claim 11, further comprising:
    mapping the dynamic parameter to the context to yield more than one choice of context-sensitive interpretation; and
    confirming with the user the selection of the interpretation with an example of the password based upon a current context.

13. A machine-implemented method comprising:
    accepting entry of at least a new portion of a password by a user into a security mechanism;
    automatically determining a non-predetermined candidate for a dynamic parameter within the password, wherein the dynamic parameter, though provided by the user, is not prompted from nor explicitly identified by the user;
    mapping the dynamic parameter to a context comprising detectable aspects of a temporal, spatial and environmental nature;
    recommending to the user one or more context-sensitive interpretations of the dynamic parameter; and
    receiving a selection by the user of the context-sensitive interpretation.

14. The method of claim 13, further comprising:
    mapping the dynamic parameter to the context to yield more than one choice of context-sensitive interpretation; and confirming with the user the selection of the interpretation with an example of the password based upon a current context.

15. The method of claim 13, further comprising allowing the user to change the interpretation of the dynamic parameter.

16. The method of claim 13, further comprising allowing the user to change a static portion of the password.

17. The method of claim 13, further comprising autocompleting the dynamic parameter during the entry of the password by the user.

18. The method of claim 14, further comprising presetting categories and mapping rules of the dynamic parameter.

19. The method of claim 18, wherein the categories and mapping rules are customizable by the user.

20. The method of claim 18, further comprising allowing the user to change the context of the dynamic parameter.

* * * * *